United States Patent Office 3,621,516
Patented Nov. 23, 1971

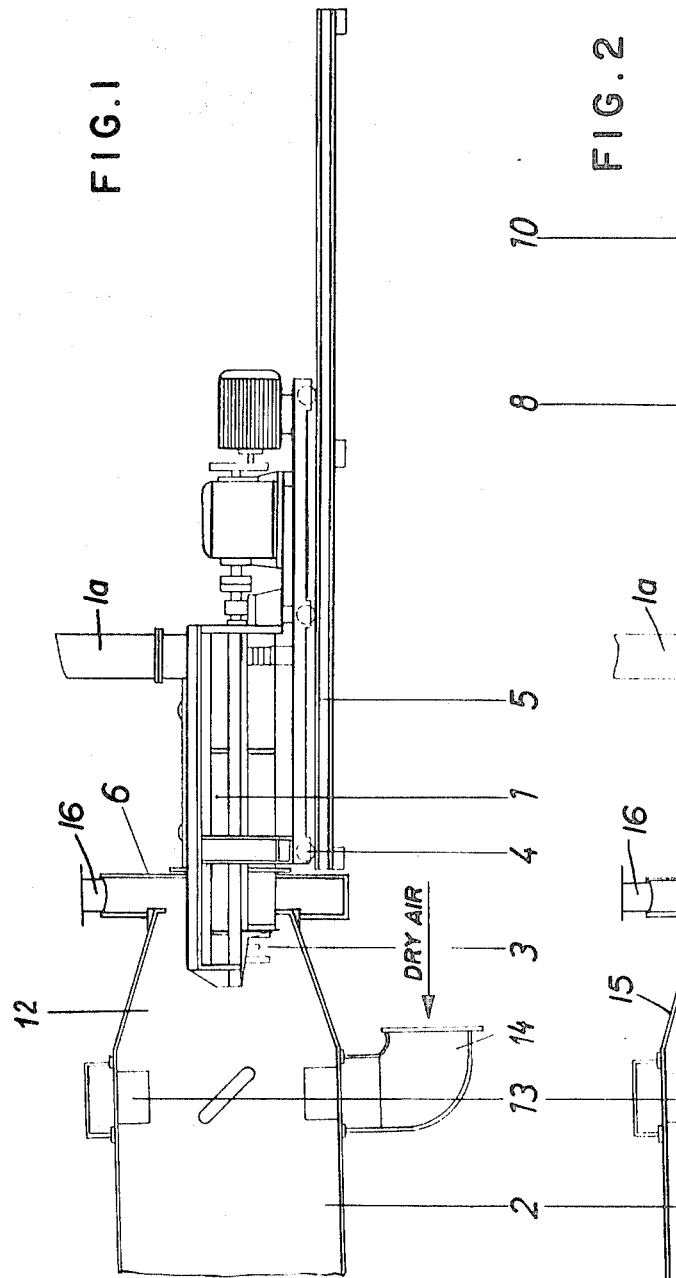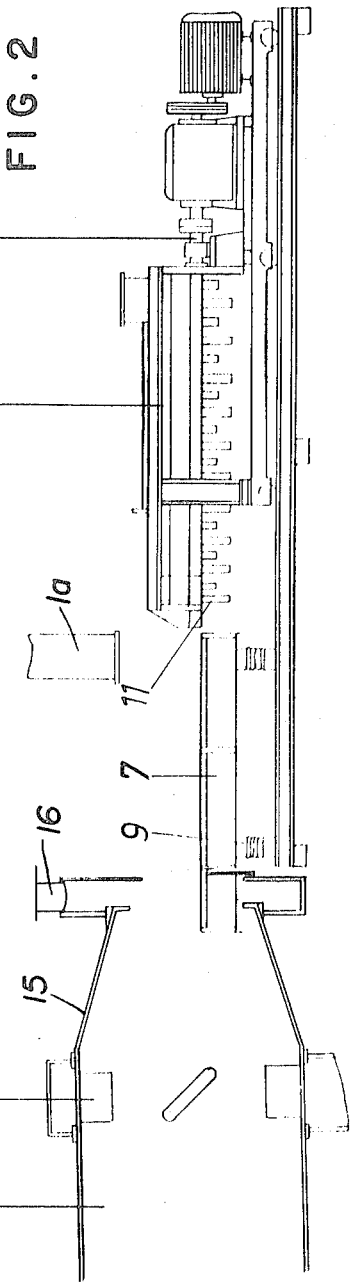

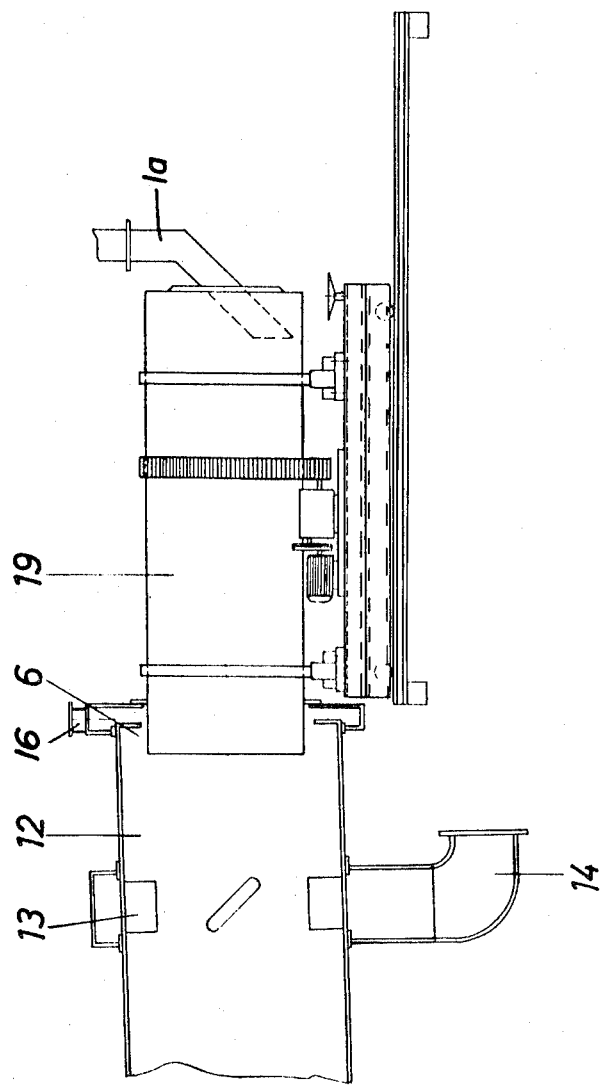

3,621,516
GRANULATING DEVICE FOR SYNTHETIC FERTILIZERS
Wilhelm Wengeler, Bochum-Stiepel, and Lothar Hoffmann, Dortmund, Germany, assignors to Friedrich Uhde GmbH, Dortmund, Germany
Filed June 9, 1969, Ser. No. 831,619
Int. Cl. B29j *1/00;* C05g *3/00*
U.S. Cl. 18—1 A                2 Claims

ABSTRACT OF THE DISCLOSURE

A granulating device for synthetic fertilizers in which the material is fed to the rear portion of a granulator in the form of a horizontally shiftable granulating device, including a power driven worm equipped with paddle-like members, housing for same being in two parts, the lower part of which can be raised or lowered, and the upper part of which is mounted on rollers which travel along horizontal tracks, enabling the granulator to move toward and away from a drying drum which is provided with air inlet openings and having a conical inlet section to which material from the granulator is discharged.

BACKGROUND OF THE INVENTION

In order to produce synthetic manures in form of granules of as uniform as possible size and shape, it is known to convey the concentrated fertilizer mash to an granulating worm or granulating drum which is attached as next step of the method to a drying drum. The transfer from the granulating worm or granulating drum to the drying drum takes place through a chute or runway. As the granulated material upon leaving the granulating worm or drum is still moist or sticky and accordingly inclined to caking or lumping together, it is necessary to observe the transfer from the granulating worm or drum to the drying drum or the chute or runway and break up the caked material on the chute or runway or upon entrance into the succeeding drying drum, and in this way prevent a clogging of the installation. In addition it is necessary to shut down the entire installation from time to time in order to clean thoroughly the chute or runway as well as the drum inlet.

Attempt has been made to prevent the adhesion of the moist manure granulate by means of lining the chute or runway with different materials such as polypropylene, rubber, glass, polished high-grade steel and other material. The chute nevertheless had to be cleaned regularly even during operation.

It is also known to convey the material issuing from the granulating worm or drum over a chute of an inlet worm with a rubber trough which projects into the drum. The passage of material along the rubber walls has a self cleaning effect for the trough. As the worm helix, however, becomes smeared and clogged in time, it must be regularly cleaned. This requires a stoppage of the operation. Also the chute which is inclined to clogging, must still be dealt with. The worm has the disadvantage that a build up of the granules to undesirably large lumps may take place.

SUMMARY OF THE INVENTION

The problem serving as basis for the invention is to prevent the adhesion of granulated synthetic manure to the transfer device between granulating worm or drum and the drying drum. This not only reduces the operative force but also decreases the number of stoppages of the operation. For the solution of this problem, the drying drum is so arranged, that the discharge side of the granulating worm or drum projects into the inlet part of the drying drum.

By means of this construction according to the invention, the freshly granulated and still moist material enters directly into the drying drum, without caking to the drying drum or adhering to a chute.

BRIEF DESCRIPTION OF THE DRAWINGS

FIG. 1 is a schematic side elevation of a granulating device for synthetic fertilizers with the granulating worm assembly advanced into operative relation with the drying drum;

FIG. 2 is a view similar to FIG. 1 showing the granulating worm assembly with the component parts separated from each other; and FIG. 3 is a schematic view in side elevation of an alternate form showing a granulating drum which is mounted for rotational movements.

The granulating worm 1 has a sufficiently large opening 3 on the discharge side projecting into the drying drum 2, on its under side, in order to prevent even under the most difficult conditions of operation a clogging of the worm. Fertilizer is introduced to the rear end of the granulating worm 1 through a vertical feed pipe 1a.

In order to maintain the accessibility to the drying drum, the granulating worm 1, in accordance with the invention is mounted on rollers 4, which ride along rails 5. Also the granulating worm is in this way, upon stoppage of the operation, well accessible for cleaning and servicing work. The passage in the inlet housing 6 of the drying drum is sealed during the operation in order to prevent the entry of unfiltered air.

Upon faulty manipulation of the granulation, the granulating worm 1 may be blocked and the contents of the worm then rigidifies in a short time into a concrete like blockage. Then the heavy covers both above and below must be opened at the clean out openings, through which with great care the rigidified material is loosened and removed with manual and compressed-air tools. In order to avoid these difficulties, according to a further inventive idea of the invention, the lower part 7 of the worm trough is stationarily mounted, while the upper part 8 is carried out with shafts, bearings and drive extended or extendable to the motor side. The extension of the upper part may take place by means of a mechanical drive. First the lower part 7 of the worm trough is somewhat lowered by means of jack 9. In opened arrangement, a worm shaft 10 paddle-like cutters 11 carried thereby are freely accessible and may easily be cleaned. The same holds true for the worm trough.

With the ordinary embodiment of the drying drum 2, on the inlet side there is a large stationary entrance housing for air, which is sealed against the rotating drum. On account of the large quantity of air, this inlet housing is made wide, so that the introduction in accordance with the invention of the granulating worm or granulating drum into the drying drum is made difficult and under certain circumstances, renders a longer worm necessary. According to a further inventive idea, therefore, the inlet for the dry air is laid from the drum entrance to the drum sleeve. In this way, the drying or also cooling air is first blown in or sucked in behind a zone 12 without substantial movement of the air through air inlet-bodies or compartments 13 into the drum sleeve in the drying drum. These bodies or compartments are insulated, so that upon inlet of hot air the product passing by is not fused on. This arrangement of the air compartments has the advantage that the end bearing of the granulating worm 1 is then in a zone of moderate temperature, so that it does not need to be cooled. The air conveyed through the air inlet passage 14 is dependent on the other blowers of the drying system which are so throttled that at the drum entrance or upon the introduction of the granulating worm into the drying drum only a very low vacuum prevails. In this way a sealing at this point becomes superfluous, so that the operations in the interior of the drum may be observed.

Many types of fertilizer upon granulation are strongly inclined to caking, so that even without the effect of hot air, in the usual feed worms in the first part of the drum, incrustations may occur. In accordance with the invention, the drying durum 2 therefore at the inlet side is constructed fully without conveyor plates. The conveyance of the granulated material from the drum entrance into the drum takes place through rolling down into a drum part 15 which is conically widened in direction of feed. In this conical drum part wtihout fittings, the product carries out greater rolling movements than in a cylindrical one with feed spirals. For many products in view of the extension or prolongation of the granulating time, an improvement of the quality of the granules may be obtained.

Some types of manure require not only a prolonged granulating time than is attained in the conical part of the drying drum according to the invention, but additionally also a mild drying of the surface of the granulated material. It is therefore of advantage to provide at the entrance housing of the drying drum a connecting piece 16 through which a small measured quantity of hot air, preferably exhaust air, is blown after it has been freed from dust.

FIG. 3 shows a granulating device according to the invention, with a granulating drum 19 projecting into the drying drum. Granulating drums are for example utilized for types of fertilizer with high portions of superphosphate, monoammoniumphosphate or diammoniumphosphate, as these products require a longer duration during the granulation. Then also frequently the granules leaving the granulating drum are so moist, that they cake on chutes and fittings, so that the construction in accordance with the invention is of special advantage also for granulating devices with granulating drum.

What is claimed is:

1. A granulating device for synthetic fertilizers comprising,
    a granulating device,
    a roller mounting for said device,
    rails for said roller mounting enabling shifting of said granulating device to and fro,
    a drying drum adjacent said granulating device and into which the latter is shiftable,
    means to feed material to the rear end portion of said granulating device,
    means forming a part of said granulating device for breaking up the material delivered thereto and feeding same forwardly for discharge to said drying drum,
    said granulating device and drying drum being sealed against each other,
    means providing a hot air inlet on the material feed end of said drying drum, and
    a conical inlet portion on said drying drum.

2. A granulating device for synthetic fertilizers as claimed in claim 1, comprising
    a housing for said granulating device,
    said housing having upper and lower parts,
    a power driven shaft equipped with paddle-like members in said upper housing part,
    said upper housing part being equipped with said roller mounting, and
    means for vertically adjusting said lower housing part toward and away from said upper housing part.

References Cited
UNITED STATES PATENTS

| | | | |
|---|---|---|---|
| 275,758 | 4/1883 | Felthousen | 198—213 |
| 1,858,956 | 5/1932 | Hepperle | 18—30 PA |
| 2,268,816 | 1/1942 | Gabeler et al. | 18—1 A |
| 2,297,300 | 9/1942 | Hardesty et al. | 25—AG & PELLET |
| 2,411,873 | 12/1946 | Firth | 18—1 A UX |
| 2,831,210 | 4/1958 | De Vaney | 18—1 A |
| 2,930,498 | 3/1960 | Felbeck | 214—17.82 |
| 3,149,923 | 9/1964 | Lavallee | 23—259.1 |
| 3,209,898 | 10/1965 | Beebe et al. | 198—213 |
| 3,390,424 | 7/1968 | Fortune | 18—1 A |

ROBERT L. SPICER, JR., Primary Examiner

U.S. Cl. X.R.

23—259.1